United States Patent
Burrows et al.

(10) Patent No.: US 6,293,575 B1
(45) Date of Patent: Sep. 25, 2001

(54) FOLDABLE FRAME ASSEMBLY FOR A BICYCLE

(75) Inventors: Mike Burrows, Norwich (GB); Darly Yang, Miao-Li Hsien (TW)

(73) Assignee: Gaint Manufacturing Co., Ltd., Taichung Hsien (TW)

(*) Notice: Subject to any disclaimer, the term of this patent is extended or adjusted under 35 U.S.C. 154(b) by 0 days.

(21) Appl. No.: 09/624,277

(22) Filed: Jul. 24, 2000

(51) Int. Cl.$^7$ ................................................ B62K 15/00
(52) U.S. Cl. .......................................... 280/287; 280/278
(58) Field of Search ................................ 280/287, 278; 16/324, 321; 292/113

(56) References Cited

U.S. PATENT DOCUMENTS

| | | | |
|---|---|---|---|
| 4,440,414 | * | 4/1984 | Wang .................................... 280/287 |
| 5,269,550 | * | 12/1993 | Hon et al. ............................ 280/287 |
| 5,398,955 | * | 3/1995 | Yeh ...................................... 280/287 |
| 5,440,948 | * | 8/1995 | Cheng .................................. 74/551.3 |
| 5,492,350 | * | 2/1996 | Pan ...................................... 280/278 |
| 5,590,895 | * | 1/1997 | Hiramoto ............................. 280/278 |
| 5,794,958 | * | 8/1998 | Hsiao ................................... 280/287 |
| 6,135,668 | * | 10/2000 | Lin ...................................... 403/322.4 |

FOREIGN PATENT DOCUMENTS

1112828 * 11/1966 (GB) ............................ B62K/15/00

* cited by examiner

*Primary Examiner*—Anne Marie Boehler
*Assistant Examiner*—Tony Winner
(74) *Attorney, Agent, or Firm*—Christie, Parker & Hale, LLP (57) ABSTRACT

A foldable frame assembly including pivotally connected first and second frame members to permit relative movement between a folded position to an unfolded position, and a fastening device mounted in an accommodating recess formed by proximate end portions of the first and second frame members. The fastening device includes a handle member operable from a releasing position to a locking position to retain the first and second frame members in the unfolded position. At the locking position, the handle member is provided within the accommodating space while at the releasing position, the handle member projects outwardly from the accommodating space.

8 Claims, 6 Drawing Sheets

FOLDABLE FRAME ASSEMBLY FOR A BICYCLE

BACKGROUND OF THE INVENTION

1. Field of the Invention

The invention relates to a frame assembly, more particularly to a foldable frame assembly for a bicycle.

2. Description of the Related Art

A conventional foldable frame assembly for a bicycle includes first and second frame members with proximate end portions, a coupler plate interposed between and pivotally connected to the proximate end portions of the first and second frame members to permit relative movement between the first and second frame members from a folded position to an unfolded position, and a fastening device for fastening together the first and second frame members to prevent relative movement therebetween at the unfolded position. The fastening device includes a spring-loaded locking bolt with a first end portion connected to the coupler plate, an operating lever connected pivotally to a second end portion of the locking bolt, and a socket member provided on the locking bolt and biased away from the coupler plate. The socket member is associated with the operating lever via a cam mechanism such that the operating lever is operable from a releasing position to a locking position so as to push the socket member toward the coupler plate against the biasing action to engage locking protrusions on the proximate end portions of the first and second frame members and retain the frame members at the unfolded position.

Some of the disadvantages that result from the use of the conventional foldable frame assembly are as follows:

(i) Because the locking bolt project outwardly from one side of the frame members, the fastening device can easily get caught by the garment of the user, thereby causing inconvenience to the user.

(ii) The socket member will eventually disengage from the locking protrusions at the proximate end portions of the frame members due to fatigue of the spring that is loaded on the locking bolt, thereby untimely disposing the operating lever in the releasing position.

(iii) Vibration of the frame members during riding on an uneven is severe and generates noise sound.

SUMMARY OF THE INVENTION

The main object of this invention is to provide a foldable frame assembly for a bicycle which is clear of the aforesaid disadvantages that are generally associated with the conventional foldable frame assembly.

Accordingly, a foldable frame assembly for a bicycle of the present invention includes a first frame member, a second frame member, a pivot member with a first axis to interconnect pivotally proximate end portions of the first and second frame members and permit relative movement between the first and second frame members from a folded position to an unfolded position, and a fastening device mounted on the first and second frame members. The fastening device is operable to retain the first and second frame members in the unfolded position. The proximate end portions of the first and second frame members are formed with first and second recesses, respectively. The first and second recesses have a respective recess bottom and cooperatively form an accommodating space that extends in a longitudinal direction transverse to the first axis of the pivot member. The fastening device is mounted in the accommodating space, and includes a hooking seat, a pivot seat, an elongated handle member, a connecting rod, and a hook member. The hooking seat has a mounting section mounted securely on the recess bottom of the first recess, and a hooking section that extends from the mounting section into the first recess. The pivot seat is mounted securely on the recess bottom of the second recess. The handle member has an operating portion and a connecting portion on one end of the operating portion. The connection portion has first and second pivot units. The first pivot unit is mounted pivotally on the pivot seat about a second axis transverse to the longitudinal direction such that the handle member is pivotable between a locking position, where the operating portion of the handle member is disposed in the second recess, and a releasing position, where the operating portion extends outwardly of the second recess. The connecting rod has a pivot section pivoted to the second pivot unit about a third axis parallel to the second axis, and a distal section that extends from the pivot section toward the first recess. The hook member has a coupling portion coupled to the distal section of the connecting rod, and a hooking portion that extends from the coupling portion for engaging the hook section of the hooking seat such that, when the hooking portion engages the hooking section, movement of the handle member from the releasing position to the locking position will result in a pulling force on the connecting rod to engage firmly the hooking portion with the hooking section and retain securely the first and second frame members in the unfolded position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Referring to FIGS. 1, 2, 3 and 4, the preferred embodiment of a bicycle frame assembly 10 of the present invention is shown to include a wheel-carrying first frame member 11, a wheel-carrying second frame member 12, a pivot member 14 with a first axis, and a fastening device 20.

Figure 3:
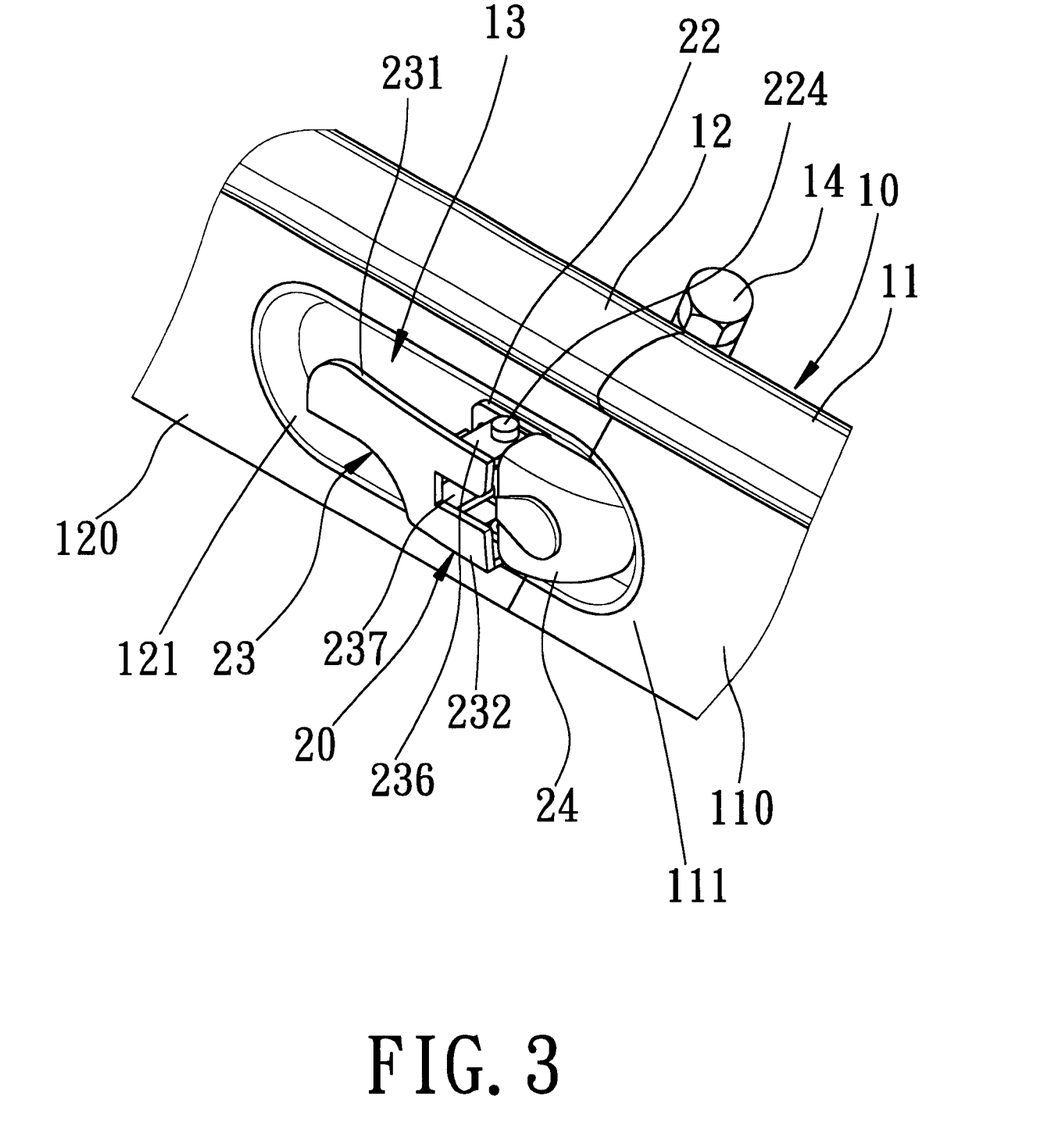
FIG. 3 is a fragmentary schematic side view of the preferred embodiment.
Figure 4:
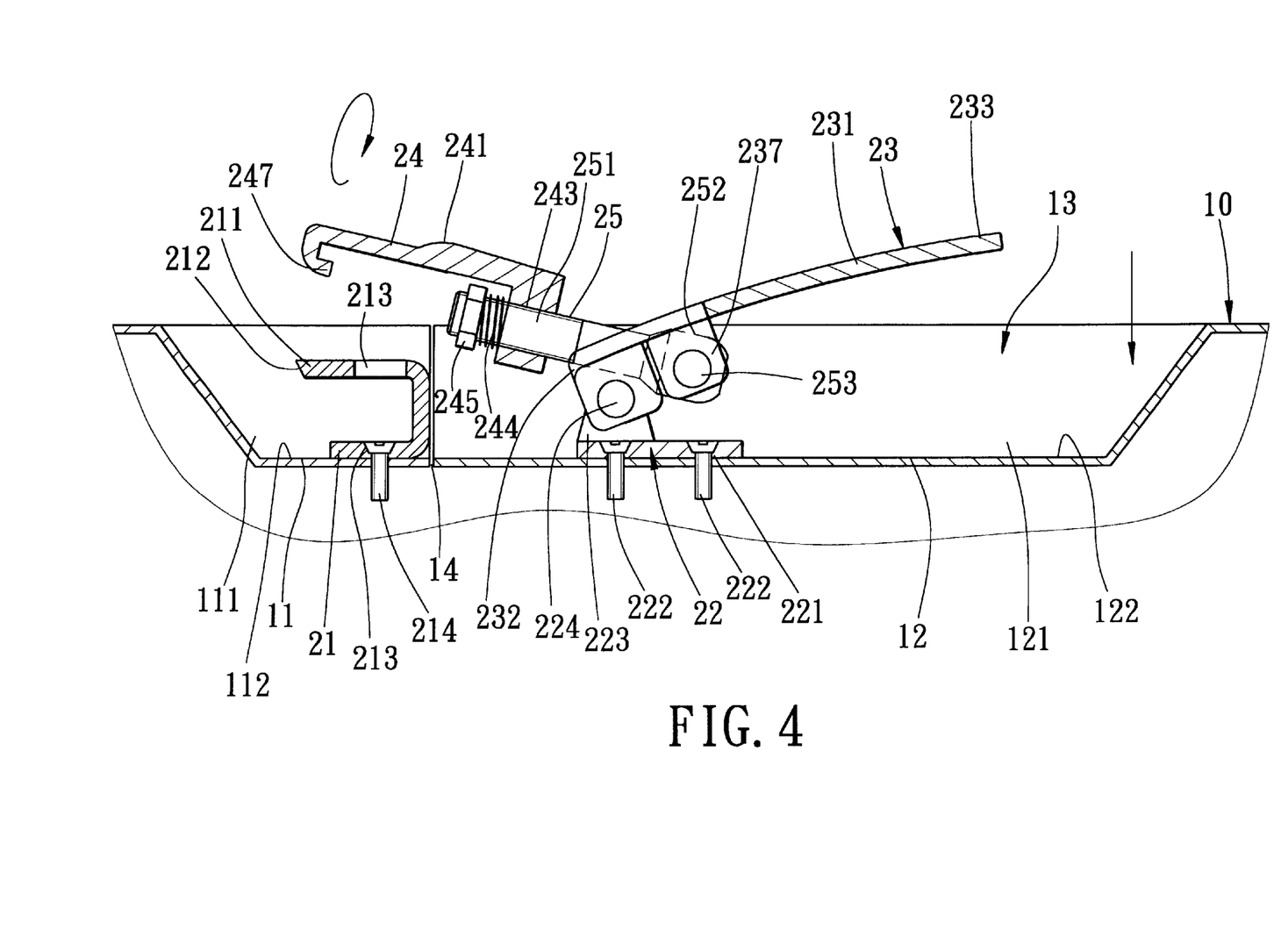
FIG. 4 is a sectional schematic side view of the preferred embodiment in a releasing position.

As illustrated, the pivot member 14 interconnects proximate end portions 110,120 of the first and second frame members 11,12 pivotally to permit relative movement between the first and second frame members 11,12 from a folded position (not illustrated) to an unfolded position, as best shown in FIG. 3.

The fastening device 20 is mounted on the first and second frame members 11,12 and is operable to retain the first and second frame members 11,12 in the unfolded position.

The proximate end portions 110,120 of the first and second frame members 11,12 are formed with first and second recesses 111,121, respectively. The first and second recesses 111,121 have a respective recess bottom 112,122 and cooperatively form an accommodating space 13 that extends in a longitudinal direction transverse to the first axis of the pivot member 14.

Figure 1:
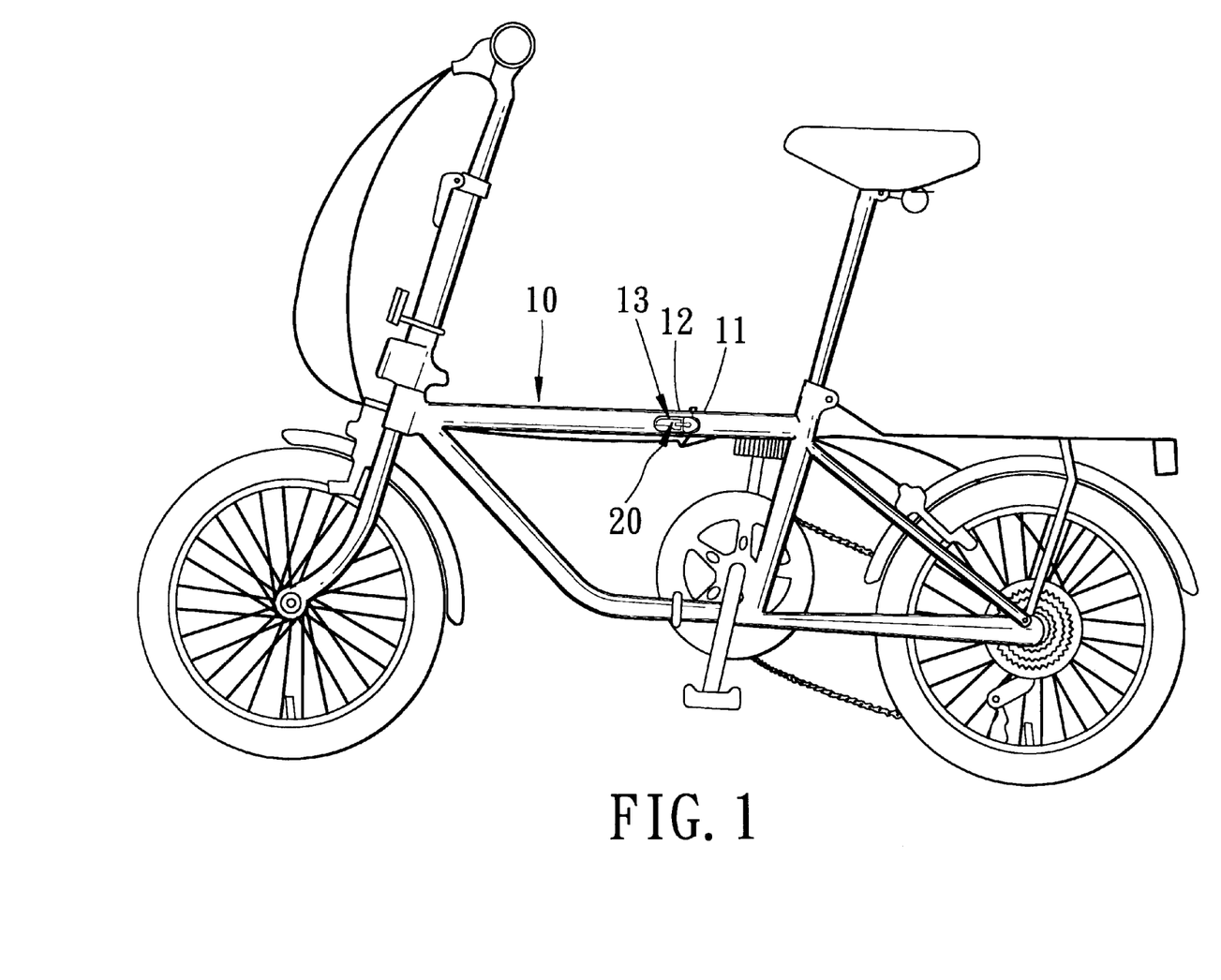
FIG. 1 is a schematic view of a bicycle incorporating the preferred embodiment of a foldable frame assembly of the present invention.
Figure 2:
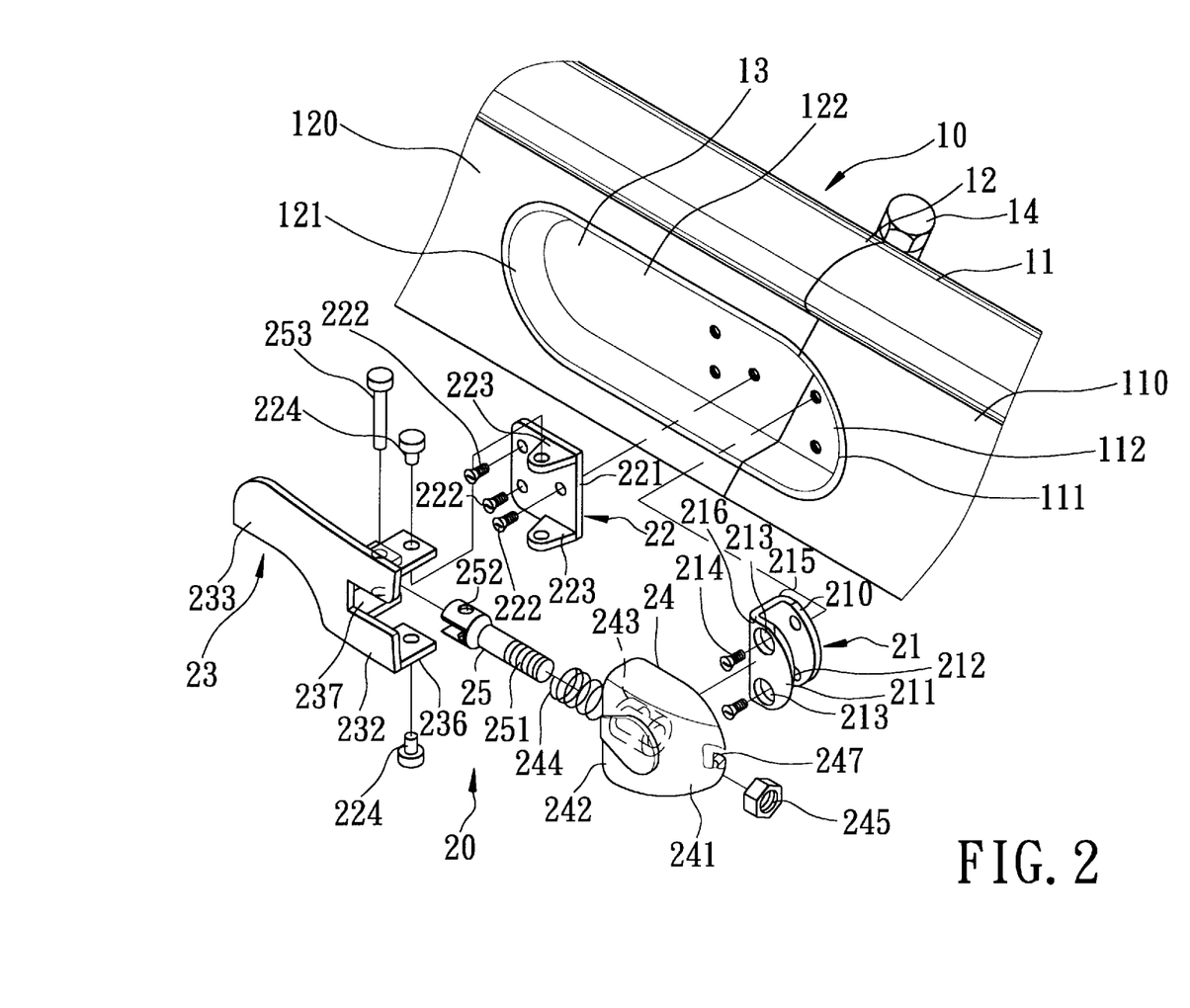
FIG. 2 is a fragmentary and partly exploded view of the preferred embodiment.

In the preferred embodiment, the fastening device 20 is mounted in the accommodating space 13, and includes a hooking seat 21, a pivot seat 22, an elongated handle member 23, a connecting rod 25 and a hook member 24. The pivot seat 22 includes a mounting base 221 mounted securely on the recess bottom 122 of the second recess 12 by means of screws 222, and a pair of pivot ears 223 extending from the mounting base 221. The hooking seat 21 has a mounting section 210 mounted securely on the recess bottom 112 of the first recess 111 by means of screws 214, and a hooking section 211 that extends from the mounting section 210 into the first recess 111. Preferably, the hooking section 211 has a first portion 215 that extends perpendicularly from the mounting section 210, and a second portion 216 that extends transversely from the first portion 215 in the longitudinal direction away from the pivot seat 22. The second portion 216 is disposed spacedly from the recess bottom 112 of the first recess 111. The second portion 216 is preferably formed with two holes 213 for passage of the screws 214 during mounting of the mounting section 210 on the recess bottom 112.

The handle member 23 has an operating portion 233 and a connecting portion 232 on one end of the operating portion 233. The connecting portion 232 has a first pivot unit 236 in the form of a pair of parallel pivot lugs that flank the pivot ears 223 to permit extension of two rivets 224 along a second axis such that each of the rivets 224 mounts one of the pivot lugs onto a corresponding one of the pivot ears 223. Under such a condition, the handle member 23 is pivotable between a locking position, where the operating portion 233 of the handle member 23 is disposed in the second recess 121 (see FIG. 3), and a releasing position (see FIG. 4), where the operating portion 233 extends outwardly of the second recess 121. The second axis extends transverse to the longitudinal direction. The connecting portion 232 further has a second pivot unit 237 in the form of parallel pivot lugs.

The connecting rod 25 has a pivot section pivoted to the pivot lugs of the second pivot unit 237 by a pivot pin 253 that extends in a third axis parallel to the second axis, and a distal section 251 that extends from the pivot section 252 toward the first recess 111. The third axis is disposed at one side of the second axis opposite to the hooking seat 21. Preferably, the distal section 251 of the connecting rod 25 is formed with an external screw thread.

The hook member 24 has a coupling portion 242 coupled slidably to the distal section 251 of the connecting rod 25. An internally threaded nut 245 is threaded on the distal section 251 of the connecting rod 25 to prevent disengagement of the hook member 24 from the connecting rod 25. A spring member 244 is sleeved around the connecting rod 25 such that the spring member 244 is disposed between the hook member 24 and the nut 245 to bias the hook member 24 toward the pivot seat 22. Preferably, the coupling portion 242 is formed with through hole 243 for extension of the connecting rod 25. The hook member 24 further has a hooking portion 241 extending from the coupling portion 242 for engaging the hooking section 211 of the hooking seat 21. The hooking portion 241 is transverse to the coupling portion 242, and extends parallel to the connecting rod 25 such that the hook member 24 is juxtaposed relative to the second portion 216 of the hooking section 211, when a distal hooking end 247 of the hooking portion 241 engages a beveled distal engaging end 212 in the second portion 216. Under such a condition, movement of the handle member 23 from the releasing position to the locking position will result in a pulling force on the connecting rod 25 to engage firmly the hooking portion 241 with the hooking section 211 and retain securely the first and second frame members 11,12 in the unfolded position.

Figure 5:
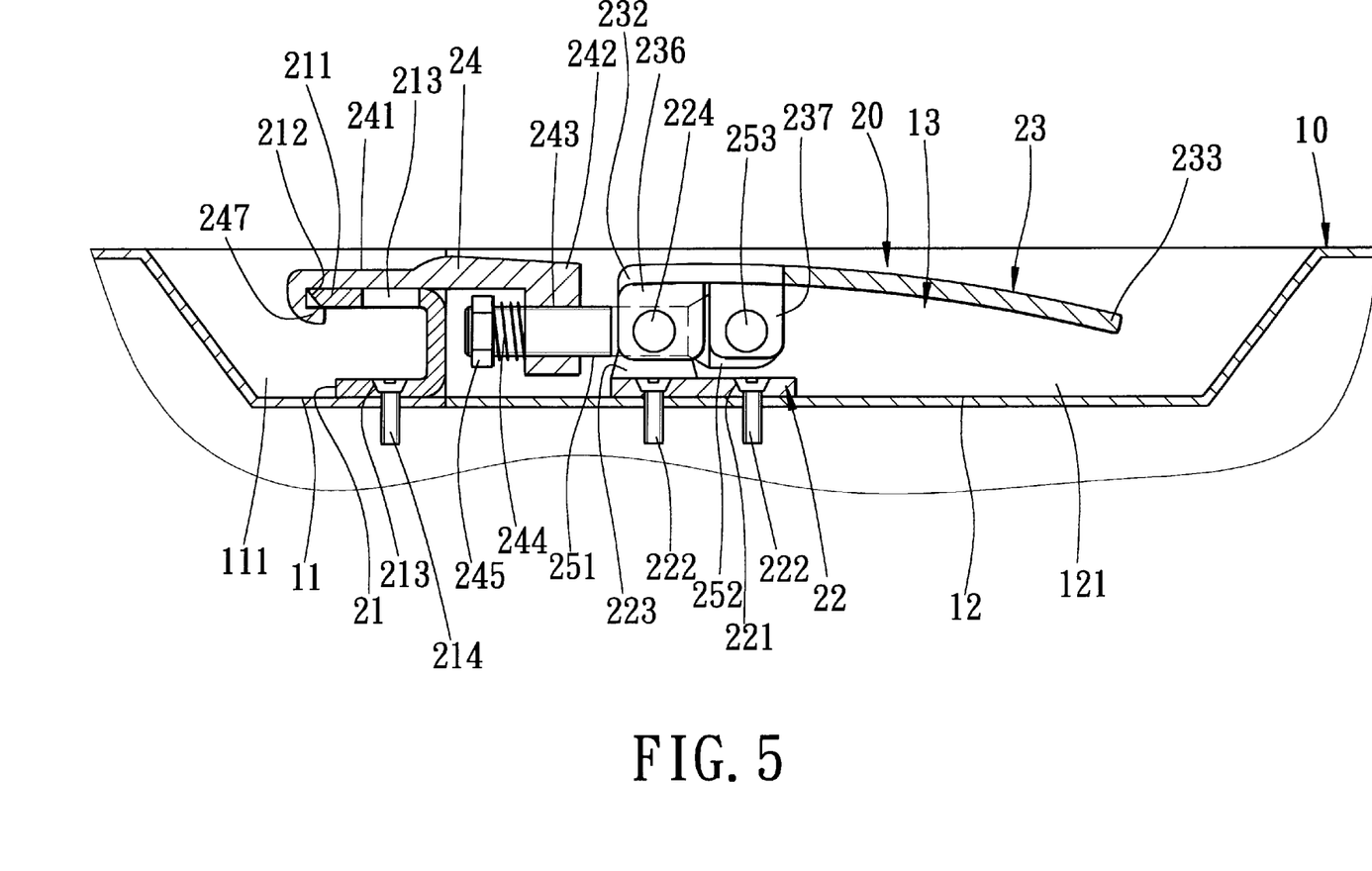
FIG. 5 is a sectional schematic side view of the preferred embodiment in the locking position.
Figure 6:
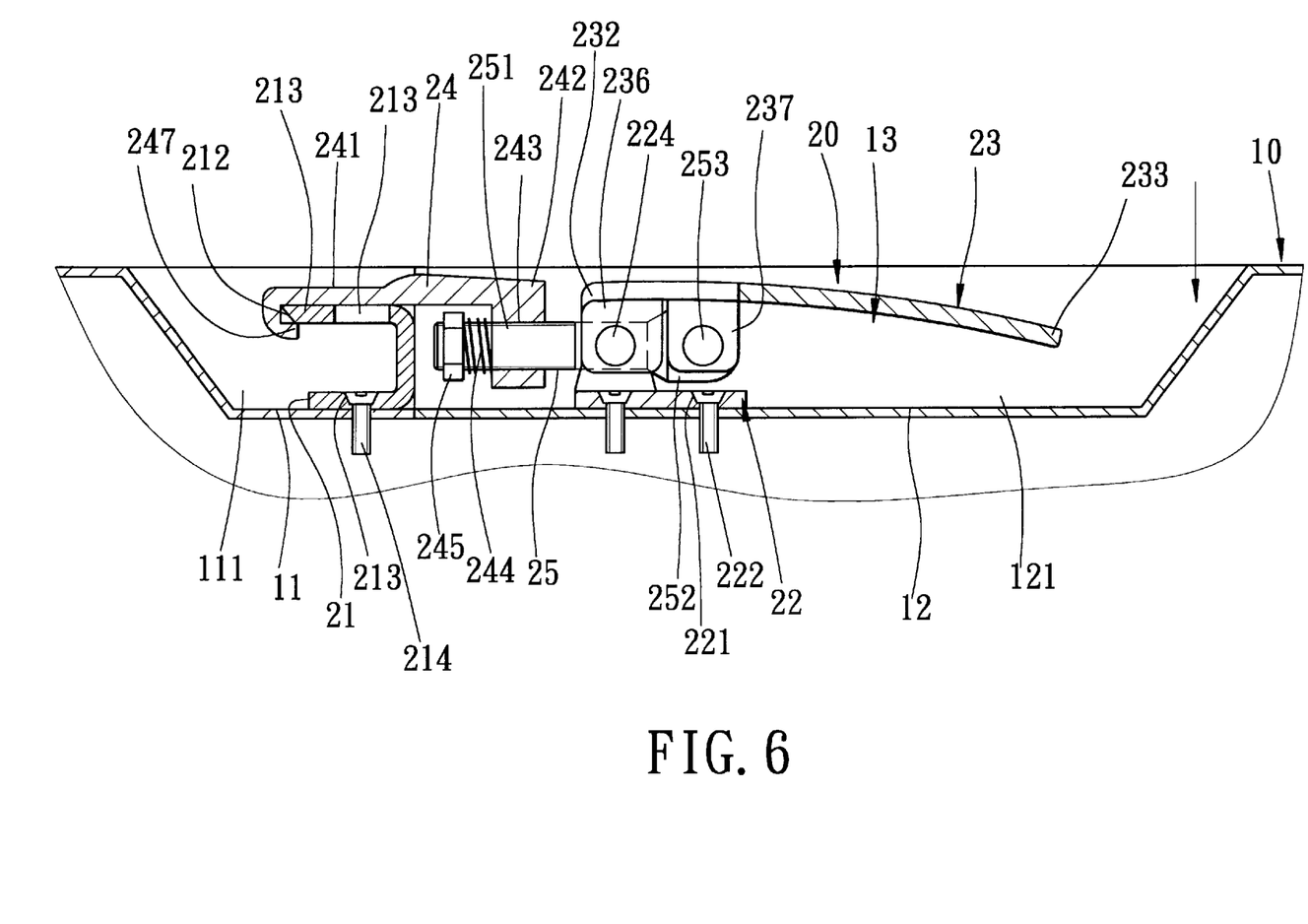
FIG. 6 is a sectional schematic side view of the preferred embodiment in the locking position after adjustment of the biasing action of the spring employed therein.

As best shown in FIG. 5, at the locking position, the handle member 23 of the fastening device 20 will be disposed in the accommodating space 13 and inwardly with respect to the outermost wall surface 15 of the frame members 11,12 such that hooking of the garment worn by the user on the handle member 23 can be avoided. Moreover, the pulling force on the connecting rod 25 for engaging the hooking portion 241 of the hook member 24 with the hooking section 211 of the hooking seat 21 can be adjusted by rotation of the nut 245 with respect to the distal threaded section 251, thereby varying force of the spring member 244, as best shown in FIG. 6.

With this invention thus explained, it is apparent that numerous modifications and variations can be made without departing from the scope and spirit of this invention. It is therefore intended that this invention be limited only as indicated in the appended claims.

What is claimed is:

1. A foldable frame assembly for a bicycle, including a first frame member, a second frame member, a pivot member with a first axis, the pivot member interconnecting pivotally proximate end portions of the first and second frame members to permit relative movement between the first and second frame members from a folded position to an unfolded position, and a fastening device mounted on the first and second frame members and operable so as to retain the first and second frame members in the unfolded position, characterized in that:

the proximate end portions of the first and second frame members are formed with first and second recesses, respectively, the first and second recesses having a respective recess bottom and cooperatively forming an accommodating space that extends in a longitudinal direction transverse to the first axis of the pivot member; and the fastening device is mounted in the accommodating space, and includes a hooking seat having a mounting section mounted securely on the recess bottom of the first recess, and a hooking section extending from the mounting section into the first recess, a pivot seat mounted securely on the recess bottom of the second recess, an elongated handle member having an operating portion and a connecting portion on one of the operating portion, the connecting portion having first and second pivot units, the first pivot unit being mounted pivotally on the pivot seat about a second axis transverse to the longitudinal direction such that the handle member is pivotable between a locking position, where the operating portion of the handle member is disposed in the second recess, and a releasing position, where the operating portion extends outwardly of the second recess, a connecting rod having a pivot section pivoted to the second pivot unit about a third axis parallel to the second axis, and a distal section extending from the pivot section toward the first recess, and a hook member having a coupling portion coupled to the distal section of the connecting rod, and a hooking portion extending from the coupling portion for engaging the hooking section of the hooking seat such that, when the hooking portion engages the hooking section, movement of the handle member from the releasing position to the locking position will result in a pulling force on the connecting rod to engage firmly the hooking portion with the hooking section and retain securely the first and second frame members in the unfolded position.

2. The foldable assembly as defined in claim 1, further characterized in that the third axis is disposed on one side of the second axis opposite to the hooking seat.

3. The foldable assembly as defined in claim 1, further characterized in that the coupling portion of the hook member is coupled slidably to the distal section of the connecting rod, the fastening device further including a spring member provided on the connecting rod for biasing the hook member toward the pivot seat.

4. The foldable assembly as defined in claim 3, further characterized in that the spring member is a coil spring sleeved around the connecting rod.

5. The foldable assembly as defined in claim 4, further characterized in that the distal section of the connecting rod is formed with an external screw thread, the fastening device further including an internally threaded nut engaging the distal section of the connecting rod such that the spring member is disposed between the hook member and the nut.

6. The foldable assembly as defined in any one of the preceding claims, further characterized in that the hooking section has a first portion extending perpendicularly from the mounting section, and a second portion extending transversely from the first portion in the longitudinal direction away from the pivot seat and disposed spacedly from the recess bottom of the first recess, the second portion having a distal engaging end.

7. The foldable assembly as defined in claim 6, further characterized in that the hooking portion of the hook member is transverse to the coupling portion and extends parallel to the connecting rod for juxtaposition with the second portion of the hooking section during engagement between the hooking portion and the hooking section, the hooking portion being formed with a distal hooking end for engaging the distal engaging end of the second portion of the hooking section.

8. The foldable assembly as defined in claim 1, further characterized in that the first pivot unit includes a parallel pair of lugs, the pivot seat including a mounting base mounted securely on the recess bottom of the second recess, a spaced pair of pivot ears projecting from the mounting base and flanked by the pivot lugs, and a pair of rivets, each of which extends along the second axis and mounts pivotally one of the pivot lugs onto a corresponding one of the pivot ears.

* * * * *

UNITED STATES PATENT AND TRADEMARK OFFICE
CERTIFICATE OF CORRECTION

PATENT NO.   : 6,293,575 B1
DATED        : September 25, 2001
INVENTOR(S)  : Mike Burrows and Darly Yang It is certified that error appears in the above-identified patent and that said Letters Patent is hereby corrected as shown below:

<u>Title page,</u>
Item [73], Assignee should read -- Giant Manufacturing Co., Ltd.
                                    Taichung Hsien (TW) --.

Signed and Sealed this

Fifteenth Day of October, 2002

*Attest:*

JAMES E. ROGAN
*Attesting Officer*       *Director of the United States Patent and Trademark Office*